United States Patent Office 2,728,801
Patented Dec. 27, 1955

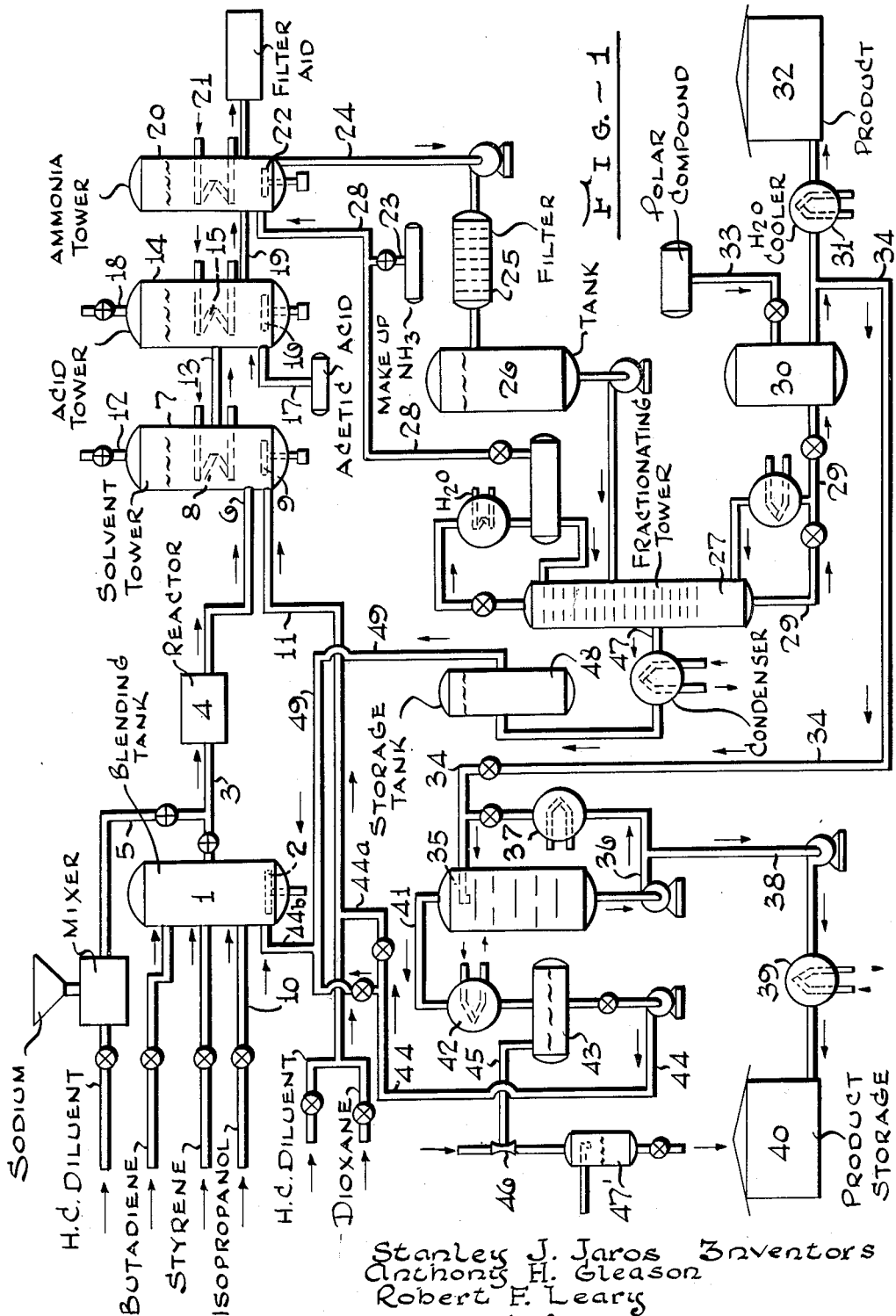

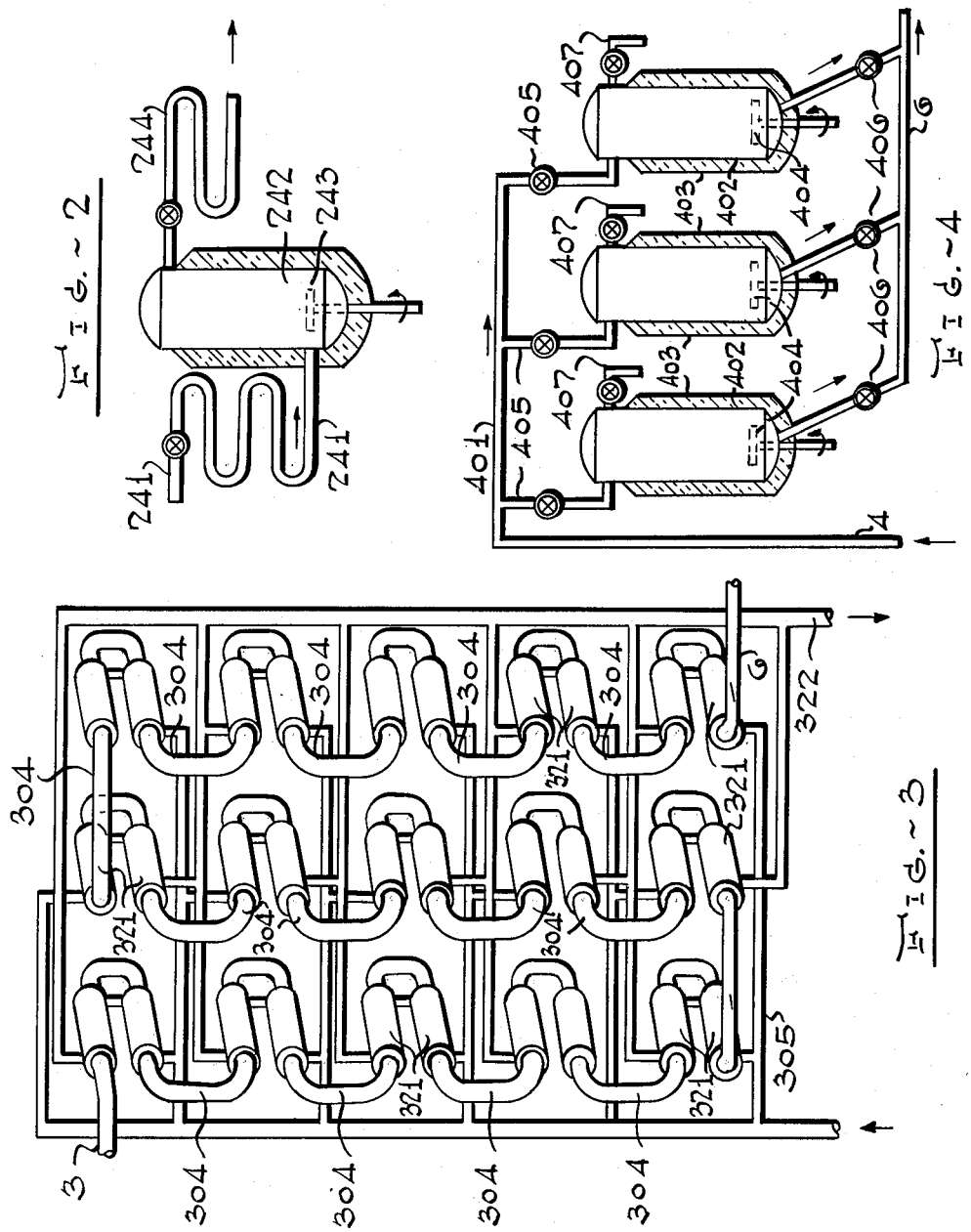

2,728,801

HYDROCARBON DRYING OIL PRODUCTION

Stanley E. Jaros, Rahway, Anthony H. Gleason, Westfield, and Robert F. Leary, Cranford, N. J., assignors to Esso Research and Engineering Company, a corporation of Delaware Original application December 23, 1949, Serial No. 134,714. Divided and this application June 16, 1952, Serial No. 293,772

5 Claims. (Cl. 260—666)

This invention relates to a process for making a drying oil or varnish by polymerization of a diolefin such as butadiene in the presence of sodium. This is a division of co-pending application Serial No. 134,714, filed December 23, 1949.

Drying oils of excellent quality can be made by polymerizing 100 parts of butadiene monomer, or particularly by copolymerizing about 75 to 85 parts of butadiene-1,3 and about 25 to 15 parts of styrene at 25 to 95° C., preferably at 65 to 85° C., in the presence of about 50 to 500 parts of an inert hydrocarbon diluent boiling between about 0 and 250° C., or preferably between 50 and 200° C., such as pentane, benzene, cyclohexane, naphtha or mineral spirits. Where low boiling materials are used, it is desirable to operate under sufficient pressure to maintain the charge in liquid phase, e. g. under pressures ranging from 1 to 5 atmospheres. About 0.1 to 10 parts, preferably about 1 to 3 parts of finely divided sodium metal is used as catalyst. Certain promoting agents, e. g. about 10 to 50 parts of dioxane and catalyst activators, e. g. 1 to 20 percent of isopropyl alcohol based on the weight of sodium, are also preferably added to the reaction mixture to assure the production of a colorless oil and to shorten the reaction time. Throughout this specification, all references to proportions of materials are expressed in parts by weight, unless stated otherwise.

When the reaction has reached the desired conversion, which may be about 50, 80 or preferably 100%, the catalyst is destroyed and converted into an easily filtrable salt by addition of an essentially anhydrous monobasic saturated $C_1$ to $C_5$ organic acid which is soluble in the hydrocarbon mixture. The acid, such as formic, acetic or pentanoic, is added directly to the crude reaction product and the resulting sodium salt is thereafter separated from the crude product by filtration. Then the crude filtrate is fractionated to remove the promoting and activating agents as well as any unreacted monomer and promoter and also to adjust the concentration of the oily polymer in the product to desired level, which may be between about 30 and 99% non-volatile matter.

Unlike natural drying oils the resulting product is useful as a varnish without requiring any further treatment for purposes of bodying or the like, but nevertheless it is often desirable to subject the product to a heating step for about 30 to 240 minutes at about 120 to 180° C. whereby certain properties such as gloss of the oil are improved. It is particularly advantageous to carry out the heating step in the presence of a small amount of a polar compound such as maleic anhydride, acrylonitrile or thioglycolic acid.

When the original work was carried out in small scale batches, it became apparent that a drying oil or varnish of excellent quality was obtained. At the same time, however, it became apparent that the translation of the process into a large scale, commercial operation would involve serious difficulties. For example, the handling and destruction of relatively large amounts of metallic sodium represents a manifest fire and explosion hazard. Secondly, whereas the initial induction period characteristic of the reaction was not particularly detrimental in small scale batch operation, since there it took up only a rather short time interval whereas the overall average reaction rate was quite rapid, this poisoning effect equivalent to the induction phenomenon became a problem of the greatest magnitude in large scale or continuous operation.

Heretofore, in a continuous process wherein the reagents were continuously fed to a one-stage equilibrium reactor and the polymerized product continuously withdrawn therefrom after a certain residence time, the unknown materials or conditions responsible for the induction period poisoned the overall reaction rate to such an extent that the required residence time became uneconomically long. The separation of the various non-hydrocarbon constituents such as dioxane, alcohol and acetic acid from the crude product also represented an uneconomical step when translated from experimental into large scale production, inasmuch as normally at least three corrosion resistant distillation towers would be required. In such an experimental system the first tower would serve to separate the crude product into a bottom stream containing the oily polymer in solution in the hydrocarbon solvent and an overhead stream containing excess hydrocarbon solvent, unreacted monomer, ether promoter, alcohol and acetic acid; this stream would be fractionated in a second tower to give an overhead stream containing the ether promoter and alcohol and a bottom stream containing the hydrocarbon solvent and acetic acid; finally this bottom stream would be fractionated in a third tower to give acetic acid in an overhead stream and hydrocarbon solvent in a bottom stream, it being extremely important to keep any trace of acid from being recycled to the reaction zone.

It is the principal object of the present invention to devise an improved process for the sodium polymerization of butadienoid drying oils on an industrial scale. This and other objects will appear more clearly from the subsequent description.

Figure 1 of the accompanying drawing schematically illustrates the preferred equipment and flow sheet involved in carrying out the invention;

Figure 2 illustrates the preferred type of polymerization reactor;

Figure 3 illustrates an alternative type of reactor; and

Figure 4 illustrates a polymerization system of still another type.

Referring to Figure 1, the reaction mixture is preferably made up in blending tank 1 into which butadiene, styrene, isopropyl alcohol, dioxane and straight run mineral spirits or other hydrocarbon diluent are introduced in the desired proportions. The reaction monomers and make-up quantities of the alcohol are introduced to tank 1 from conventional storage facilities not shown and further amounts of the alcohol, dioxane and the hydrocarbon diluent are introduced to tank 1 through recycle line 10 which leads from the recovery equipment described later. After the materials have been properly mixed in tank 1 by means of stirrer 2, a stream of the resulting mixture is withdrawn through line 3 to reactor 4. Suitable reactor arrangements are described in detail hereafter in reference to Figures 2, 3 and 4. Prior to entering reactor 4 line 3 may be joined by line 5 through which sodium catalyst is introduced into reactor 4, preferably in the form of a slurry of finely divided catalyst particles in mineral spirits or other suitable hydrocarbon liquid. Alternatively, catalyst line 5 may enter the reactor separately. The average diameter of catalyst particles useful in the present invention ranges between about 1 and 100 microns, preferably between 10 and 50 microns. Furthermore, instead of mixing the styrene monomer into the feed in tank 1, it may be introduced directly into reactor 4 by a separate line as will be described later.

Instead of p-dioxane, which is by far the best promoter for the purposes of the present invention, other mono- or di-ethers of 2 to 8 carbons atoms, other than cyclic di-ethers of the meta-dioxane type characterized by an —O—C—O— ring structure, may be used likewise where not quite as good product quality or lower reaction rate can be tolerated. Examples of such suitable ethers are diethyl ether, diisopropyl ether, diethyl acetal, ethylene glycol diethyl ether, furane and the like.

After a reaction or residence time sufficient to allow for the desired conversion of monomers, which time may range between about 10 minutes and 10 hours depending principally on size and design of reactor, reaction temperature, catalyst concentration and particle size, the crude reaction product is withdrawn from reactor 4 through line 6 which leads to diluent treating drum 7 which contains stirrer 9 and a suitable cooling device such as internal coil 8 capable of removing any undue heat of reaction that may be generated in this zone. In this drum the partially spent sodium catalyst contained in the reaction mixture is utilized as a treating agent to remove or destroy all water and other inhibiting impurities that are or may be present in the make-up hydrocarbon and the other materials which are introduced into drum 7 through line 11. Although the introduction of the diluent and other materials at this point somewhat increases the load on the fractionation equipment used in the recovery step described later, this or an equivalent pretreatment of the diluent with sodium is one of the essential elements of the present process in that it is surprisingly effective in improving the overall efficiency of the system, as opposed to a process wherein untreated make-up materials are fed directly to the reactor. This is particularly true as regards pre-treating the hydrocarbon diluent, which constitutes the predominant fraction of the make-up streams in view of the fact that a substantial proportion of the diluent is eventually withdrawn in the final product. Conversely, in view of the relatively minute amount of dioxane required in the make-up stream solely to compensate for losses, it is feasible to introduce the latter into the reaction without pre-treatment. The addition of the hydrocarbon diluent into drum 7 has the further advantage of facilitating subsequent flow and filtration of the crude polymerization product which is quite viscous when cold, unless suitably diluted.

Water contained in the make-up diluent reacts with the sodium catalyst in drum 7 and liberated hydrogen is withdrawn overhead through line 12. The crude product, diluted with an amount of make-up hydrocarbon solvent approximately compensating for the amount of solvent contained in the finished product, is withdrawn from drum 7 through line 13 to another drum 14 provided with cooling device 15 and agitator 16. A slight excess of anhydrous acetic acid is continuously introduced into drum 14 through line 17 in order to react with the remaining sodium catalyst and thereby convert it into sodium acetate which is an inert, easily filtrable salt. Hydrogen gas produced in this reaction is removed from acid treating drum 14 through line 18. From drum 14 the acidified crude product is continuously transferred through line 19 to drum 20 also preferably provided with a cooling device 21 and agitator 22. In drum 20 the small amount of excess free acid is neutralized with ammonia gas which is bubbled in through line 28. A suitable filter aid such as kieselguhr or fuller's earth is also introduced into ammonia treating drum 20 so as to facilitate subsequent filtration of the salts from the product. It is particularly convenient to add the filter aid in the form of a thick slurry, e. g. as a dispersion in the same kind of hydrocarbon used as reaction diluent.

From drum 20 the crude product is withdrawn through line 24 and passed through conventional filtration equipment such as a filter press or even a continuous rotary vacuum filter 25. Efficient use of the latter is possible due to the crystalline form of the filtrate obtained when operating in accordance with the novel process. The filtered product is then run off to storage drum 26 which serves to smooth out any undue variations in flow rate. From drum 26 the filtered product is fed continuously to distillation tower 27 which removes excess ammonia as an overhead stream 28, concentrates a bottom stream 29 containing the oily polymer of the preferred concentration of about 50 to 70% polymer in hydrocarbon diluent, and allows the withdrawal of a vapor side stream 47 which contains dioxane, any residual isopropyl alcohol as well as excess hydrocarbon diluent. The vapor stream 47 is condensed, passed to storage tank 48 and eventually recycled to blending tank 1 through line 49.

The ammonia stream 28 is recycled to treating tank 20 after being supplemented with fresh ammonia stream 23. Product stream 29 is preferably passed through heat treating drum 30 where the drying oil is kept for about 30 to 120 minutes at a temperature of about 120 to 250° C., preferably about 150° C., in order to improve the gloss of the oil and finally the product is passed through cooler 31 to storage tank 32. If desired, a small amount, such as 0.01 to 1% (based on oily polymer) of a polar compound such as maleic anhydride is also fed continuously to tank 30 through line 33 in order to further improve the varnish properties of the product.

The storage tank is preferably provided with a steam coil or other suitable heating device adapted to maintain the tank contents at a temperature of about 40° C. or higher in order to maintain the viscous product in a state sufficiently fluid for withdrawal.

Furthermore, all or a part of the product may be tapped off through line 34 to be concentrated further to a concentration between 80 and 99%, preferably between 95 and 98%. This can be done by any convenient means, as for example, by stripping the hydrocarbon solvent from the more dilute product by circulation through baffle drum 35, return line 36 and heater 37, at a temperature of about 150° C. to 200° C. under reduced pressure of about 0.5 to 2 lbs./sq. inch absolute. The concentrated product is finally withdrawn from the bottom of the tower through line 38 and cooler 39 to storage tank 40, preferably maintained at about 90° C. to maintain the viscosity of the product in a range permitting easy pumping. The hydrocarbon solvent stripped overhead is passed through line 41 and water cooler 42 to separating drum 43 wherefrom the condensed, dry hydrocarbon solvent is recycled either through lines 44, 44a and 11 to solvent treating drum 7, or through lines 44, 44b and 10 directly to blending tank 1. The vacuum necessary for the stripping operation can be obtained readily by means of the illustrated arrangement consisting of aspirator line 45 connected to a suitable steam jet ejector 46 which in turn is connected to condenser 47'.

Alternatively, instead of concentrating the oily polymer in drum 35 as described above, the drum may be replaced by a multiplate stripping tower operated under proper conditions, e. g. at a temperature of about 150° C. and a pressure of 0.5 to 2 lbs./sq. inch absolute; the use of a suitable stripping gas such as methane improves the efficiency of the tower.

The hydrocarbon diluent, alcohol and dioxane-containing vapor side stream 47 withdrawn from principal fractionation tower 27 is recycled through storage tank 48 and return lines 49 and 10 to blending tank 1.

The choice of a proper reactor forms an important part of the novel process inasmuch as it has been discovered that with a proper system, substantially complete conversion of monomers may be achieved easily and quickly. This results in a greatly improved over-all economy in chemicals and process costs, since thereby any recovery of monomers from the product stream becomes superfluous and at the same time the otherwise inevitable loss of monomers due to escape or due to objectionable polymerization in the recycle lines is eliminated.

In developing the present invention it was observed that, even with a long nominal residence time, only very low conversion levels could be obtained when the reaction mixture was simply charged to and withdrawn from an agitated reaction tank in a continuous manner. It was always realized that continuous introduction of fresh feed into a one-stage equilibrium reactor theoretically can never be driven to complete conversion, since this implies the absence of any fresh reactants in the product stream and therefore none in the reactor. However, even when this effect was taken into account, the conversion level was found experimentally to be surprisingly low in such a continuous equilibrium reactor. A possible explanation may be that the factors which are inherent in the type of feed used herein and which are responsible for the initial induction period in batch operations, the same factors poison the continuous reaction to such an extent as to make polymerization in a reaction tank continuously fed with fresh feed impractical.

It has now been discovered that a high quality varnish or drying oil can be polymerized in a particularly efficient, continuous method by using a reactor arrangement as shown in Figure 2. The illustrated reactor consists of an externally cooled or heated coil 241 connected to a cooled reactor tank 242 provided with agitator 243 and finally an externally cooled coil 244 connected to tank 242. In this embodiment of the invention the feed mixture from blending tank 1 (shown in Fig. 1) together with a suitable amount of the sodium catalyst slurry from line 5 (shown in Fig. 1) are pumped continuously through heated coil 241 at such a rate that the feed passes through coil 241 in about 5 to 60 minutes. During this passage the temperature of the reaction mixture is gradually raised from room temperature to about 40, or even 85° C., preferably to a temperature between 50 and 65° C., and any feed impurities presumably responsible for the induction period of the polymerization reaction are destroyed, or the feed mixture is activated by contact with the catalyst. From coil 241 the warm feed and catalyst mixture is continuously introduced into agitated reaction tank 242 where most of the reaction, which is normally exothermic, takes place at a temperature between 65 and 85° C.

Tank 242 is provided with temperature control means (for heating or cooling) either by an external jacket or a heat exchanger constructed within the tank. For example, allowing for a nominal residence time of about 1 to 10 hours at about 65 to 85° C., the monomer conversion in this tank will be between about 65 and 90 percent, whereupon this partially polymerized mixture is passed continuously through cooled coil 244 whose length is such that passage of the reaction mixture therethrough takes about 5 to 30 minutes, i. e. long enough to carry the reaction to 100% completion at a suitable temperature which is again maintained preferably between 65 and 85° C. It will be understood, of course, that the actual optimum length and size of the component parts of the reactor depend somewhat on composition and flow rate of the reaction mixture, the reaction temperature, as well as the size relation between the several component parts of the reactor. It will be observed that each part serves a distinct function, namely, coil 241 serves principally to continuously activate or decontaminate the charge, though some polymerization may occur even at this stage; reactor tank 242 serves to continuously polymerize the feed substantially as far as the chemical equilibrium of the reaction mixture permits; and coil 244 serves to continuously polymerize the reaction to substantially complete conversion, which cannot be obtained in tank 242. From coil 244 the crude product passes through line 6 to the several treating drums and other finishing equipment shown in Fig. 1 and described earlier herein.

Instead of the reactor arrangement shown in Fig. 2, a single continuous coil reactor may be used as illustrated in Fig. 3, which shows one of five identical sections eventually joined in series to give a reactor having the necessary length. Such a reactor can be readily constructed by joining together standard U-shaped units 304, either to form a single coil of the desired length or to form smaller sections as shown in Fig. 3, which are finally connected in series to give the desired length. For example, for a total feed rate of about 25 gallons per minute (corresponding to a monomer feed rate of about 6 gallons of butadiene and 1.5 gallons of styrene per minute) a reaction temperature of about 85 to 90° C. and a 20-minute residence time, and assuming a heat reaction of about 700 B. t. u. per pound of polymer, a coil made of 1½ inch standard pipe units should preferably have a total length of about 4500 feet so as to provide both the necessary heat transfer surface and the volume necessary to give the residence time required for complete conversion. If the reaction is carried out at a lower temperature, e. g. at 50° C., the residence time must be increased correspondingly to about 60 minutes, in which event a coil reactor of optimum design may be constructed from 5-inch standard pipe, joined together to a total length of about 1200 feet. The coil is provided with suitable external temperature control means such as the external jackets 321 fed with a suitable heating or cooling medium from manifold 322. If desired, the first part of the coil may be heated, and the rest of it cooled. Alternatively, the entire reactor coil, or individual sections thereof, can be built within a large tank containing a cooling medium.

The use of individual sections joined in series is preferable to a unitary coil reactor, since in the former case each section may have a separate thermostatic control and hence the over-all reaction can be controlled more readily and also more accurately. Moreover, whereas the polymerization reaction in its early stages has a pronounced tendency to run away at elevated temperature levels due to the reactivity of butadiene monomer so that a relatively low initial polymerization temperature is preferable, the sectional arrangement permits one to operate each successive section at progressively higher temperatures, with a corresponding saving in total reaction time and with increased safety as compared with a polymerization at a constant, comparable temperature in a unitary coil reactor. For instance, a particularly advantageous operation can be achieved by operating the first coil section, representing the first tenth or as much as the first third of total coil length, at a temperature between about 35 and 50° C., the intermediate coil section between 50 and 70° C., and the final coil section between 70 and 90° C.

Still another reactor arrangement suitable for carrying out the present invention by semi-continuous method is illustrated in Fig. 4. In this embodiment line 3 leading from blending tank 1 (shown in Fig. 1) is connected to a manifold 401. At least three reactor tanks 402 are connected to manifold 401 in parallel, each tank being provided with suitable heating and cooling means 403, a stirrer 404, and valves 405, 406 and safety valve or frangible disk 407. When operating with this arrangement of reactors valve 405 of the first tank is opened and valve 406 is closed so that the tank is being gradually filled with fresh reaction mixture and catalyst; in the next tank, previously charged with reaction mixture and catalyst, the charge is being batch polymerized to 100% conversion while valve 406 is closed; at the same time the third tank containing a previously polymerized batch is being gradually emptied through valve 406 and line 6, valve 405 being closed and vent 407 opened to the atmosphere or to a source of suitable inert gas such as methane, nitrogen, or the like. It will be seen that in this fashion the overall process is maintained on a continuous production basis by a suitable switching of the several batch reactors from a filling cycle to a polymerization cycle to a discharge cycle. A suitable duration of each polymerization cycle as well as the filling and discharging cycles may be between about 1 and 24 hours depending on composition of feed mixture, catalyst concentration and particle size, total number and size of individual reactors, reaction temperature which may be between 50 and 95° C., and so on. It must be pointed out again, however, that although the embodiment illustrated in Figure 4 is operative for the purposes of the present invention, it has numerous drawbacks as compared with the preferred embodiment illustrated in Figure 2, the principal drawbacks being the necessary duplication of large units of equipment, the lack of true continuity and consequent difficulty of controlling product uniformity and finally also a greater need for human supervision and mechanical control.

A refinement further serving to increase the efficiency of the novel process and to raise the quality of the product involves feeding butadiene and styrene monomers to different parts of the reaction zone illustrated in Figure 2 in order to avoid the formation of polymer fractions having a high styrene content, which fractions tend to be formed in the early stages of the reaction. The formation of these objectionable polymer fractions can be avoided by not feeding the styrene as shown in Figure 1, but instead styrene monomer is taken from storage directly to reactor 242 shown in Figure 2 so that no styrene is present in the initial stage of the reaction taking place in coil 241. Where the single-coil reactor illustrated in Figure 3 is used, a similarly favorable result can be achieved by introducing styrene into the reactor coil at an intermediate stage, e. g. after about one tenth to one third of the total coil length, instead of feeding it into the coil together with the butadiene feed through line 3 as shown in Figure 3. Finally, where batch reactors are used as illustrated in Figure 4, the same favorable effect may be achieved by withholding styrene monomer from the initial feed and instead introducing styrene into the polymerization zone only at the end of the induction period, or about 10 to 30 minutes after the particular reactor has been put on stream.

The foregoing description is illustrative of the present invention. However, it will be apparent to those skilled in the art that numerous variations and modifications are possible without departing from the spirit of the invention or from the scope of the appended claims. In reading the present specification and claims it should be understood that all quantities of materials are expressed in parts by weight unless expressly stated otherwise.

We claim:
1. A continuous process for producing a hydrocarbon drying oil which comprises mixing 75 to 85 parts of butadiene, 25 to 15 parts of styrene, 200 to 300 parts of straight-run mineral spirits boiling between about 150 and 200° C., 10 to 35 parts of p-dioxane, 1 to 3 parts of finely dispersed sodium metal and 10 to 20% of isopropyl alcohol based on the weight of sodium, heating the mixture to a reaction temperature between 65 and 95° C. and continuously passing the heated mixture through a narrow tubular zone to activate the mixture, the length of the tubular zone being such that passage of the mixture therethrough takes about 5 to 30 minutes, thereafter agitating the mixture in a closed polymerization tank at reaction temperature until a monomer conversion of at least 65% is reached, and continuously withdrawing the partially polymerized mixture in linear flow through a second tubular zone maintained at reaction temperature, the length of said second tubular zone being such that complete conversion of monomers is obtained on passage therethrough.

2. A continuous process for producing a hydrocarbon drying oil which comprises mixing about 75 to 85 parts of butadiene, 200 to 300 parts of straight run mineral spirits boiling between about 150 and 200° C., 10 to 35 parts of p-dioxane, 1 to 3 parts of finely dispersed sodium metal, and 10 to 20% of isopropyl alcohol based on the weight of sodium, heating the mixture to a temperature between 65 and 95° C. and continuously passing the heated mixture through a tubular zone for a distance equal to a time lapse of about 5 to 30 minutes, thereafter passing the mitxure from the tubular zone to a closed polymerization tank, continuously and separately feeding 25 to 15 parts of styrene monomer to the polymerization tank, agitating the resulting mixture in the polymerization tank at 65 to 95° C. for a nominal residence time of about 1 to 10 hours, and continuously withdrawing the mixture from the polymerization tank through a second tubular zone at 65 to 95° C. for a time lapse of about 5 to 30 minutes in order to complete the polymerization of the entire monomer charge present in the mixture.

3. A continuous process for producing a hydrocarbon drying oil which comprises mixing 75 to 85 parts of butadiene, 25 to 15 parts of styrene, 200 to 300 parts of straight run mineral spirits boiling between about 150 and 200° C., 10 to 35 parts of an ether selected from the group consisting of mono and di-ethers of 2 to 8 carbon atoms and cyclic di-ethers having 2 to 8 carbon atoms other than cyclic di-ethers of the metadioxane type characterized by an —O—C—O— ring structure, 0.1 to 10 parts of finely dispersed sodium metal heating the mixture to the reaction temperature between 65 and 95° C. and continuously passing the heated mixture through a narrow tubular zone to activate the same, the length of the tubular zone being such that passage of the mixture therethrough takes about 5 to 30 minutes, thereafter agitating the mixture in a closed polymerization tank at reaction temperature until a monomer conversion of at least 65% is reached, and continuously withdrawing the partially polymerized mixture in linear flow through a second tubular zone maintained at reaction temperature, the length of said second tubular zone being such that complete conversion of monomers is obtained on passage therethrough.

4. A continuous process for producing a hydrocarbon drying oil which comprises about 75 to 85 parts of butadiene, 200 to 300 parts of straight run mineral spirits boiling between about 150 and 300° C., 10 to 35 parts of an ether chosen from the group consisting of mono and di-ethers having 2 to 8 carbon atoms and cyclic di-ethers having 2 to 8 carbon atoms other than cyclic di-ethers of the metadioxane type characterized by an —O—C—O— ring structure, 0.1 to 10 parts of finely dispersed sodium metal, heating the mixture to a temperature between 65 and 95° C. and continuously passing the heated mixture through a tubular zone for a distance equal to a time lapse of about 5 to 30 minutes, thereafter passing the mixture from the tubular zone to a closed polymerization tank, continuously and separately feeding 25 to 15 parts of styrene monomer to the polymerization tank, agitating the resulting mixture in the polymerization tank at 65 to 95° C. for a nominal residence time of about 1 to 10 hours, and continuously withdrawing the mixture from the polymerization tank through a second tubular zone at 65 to 95° C. for a time lapse of about 5 to 30 minutes in order to complete the polymerization of the entire monomer charge present in the mixture.

5. A process for producing a polymeric hydrocarbon drying oil which comprises continuously mixing 75 to 85 parts of butadiene monomer, 25 to 15 parts of styrene monomer, 200 to 300 parts of a sodium-pretreated inert hydrocarbon diluent boiling between about 100 and 200° C., about 10 to 35 parts of p-dioxane, about 1 to 10 parts of finely divided metal sodium catalyst, and about 10 to 20% of alcohol based on the weight of sodium, heating the mixture to a reaction temperature between 65 and 95° C. and continuously passing the heated mixture through a narrow tubular zone to activate the mixture, the length of the tubular zone being such that passage of the mixture therethrough takes about 5 to 30 minutes, thereafter agitating the mixture in a closed polymerization tank at reaction temperature until a monomer conversion of at least 65% is reached, and continuously withdrawing the partially polymerized mixture in linear flow through a second tubular zone maintained at reaction temperature, the length of said second tubular zone being such that complete conversion of monomers is obtained on passage therethrough, withdrawing the polymerized sodium-containing mixture to a closed treating zone, adding fresh hydrocarbon diluent in the treating zone to the withdrawn mixture in order to make up for the quantity of hydrocarbon diluent eventually withdrawn in the product and whereby the residual sodium reacts with and destroys water and other impurities present in the added diluent, venting the said treating zone, passing the resulting diluted mixture to an acid treating zone, adding an excess of glacial acetic acid to the diluted mixture in order to destroy all sodium metal, venting hydrogen from the acid treating zone, adding excess ammonia gas to the acidified mixture in a neutralizing zone in order to destroy all free acid, filtering the ammoniated mixture to remove all solids therefrom, fractionally distilling the filtered mixture, removing an overhead stream of ammonia from the distillation step and returning the ammonia to the neutralizing zone, withdrawing hydrocarbon liquid, alcohol and dioxane in a vapor side stream from the distillation step and recycling the side stream to the polymerization zone, and withdrawing a concentrated bottom product stream from the distillation step.

References Cited in the file of this patent
UNITED STATES PATENTS

| | | |
|---|---|---|
| 1,827,285 | Ebert | Oct. 13, 1931 |
| 1,832,450 | Ebert | Nov. 17, 1931 |
| 2,209,746 | Ebert | July 30, 1940 |
| 2,264,811 | Rothrock | Dec. 2, 1941 |